US010175865B2

(12) United States Patent
Beaver et al.

(10) Patent No.: US 10,175,865 B2
(45) Date of Patent: Jan. 8, 2019

(54) EVALUATING CONVERSATION DATA BASED ON RISK FACTORS

(71) Applicant: Verint Americas Inc., Alpharetta, GA (US)

(72) Inventors: Ian Beaver, Spokane Valley, WA (US); Fred Brown, Colbert, WA (US); Casey Gossard, Spokane, WA (US)

(73) Assignee: VERINT AMERICAS INC., Alpharetta, GA (US)

( * ) Notice: Subject to any disclaimer, the term of this patent is extended or adjusted under 35 U.S.C. 154(b) by 5 days.

(21) Appl. No.: 15/857,160

(22) Filed: Dec. 28, 2017

(65) Prior Publication Data

US 2018/0121062 A1 May 3, 2018

Related U.S. Application Data

(63) Continuation of application No. 14/849,541, filed on Sep. 9, 2015, now abandoned.

(60) Provisional application No. 62/048,144, filed on Sep. 9, 2014, provisional application No. 62/049,982, filed on Sep. 12, 2014.

(51) Int. Cl.

| | |
|---|---|
| *G06F 17/27* | (2006.01) |
| *G06F 3/0484* | (2013.01) |
| *G10L 15/22* | (2006.01) |
| *G10L 25/51* | (2013.01) |
| *G10L 15/30* | (2013.01) |
| *G10L 25/63* | (2013.01) |

(Continued)

(52) U.S. Cl.
CPC ........ *G06F 3/04842* (2013.01); *G06F 17/279* (2013.01); *G06F 17/2785* (2013.01); *G10L 15/22* (2013.01); *G10L 15/18* (2013.01); *G10L 15/30* (2013.01); *G10L 25/51* (2013.01); *G10L 25/63* (2013.01); *G10L 25/66* (2013.01)

(58) Field of Classification Search
CPC combination set(s) only.
See application file for complete search history.

(56) References Cited

U.S. PATENT DOCUMENTS 8,160,979 B1 * 4/2012 Evans ............... G06F 17/30675
706/45
8,424,840 B2 * 4/2013 Kratzer ................ B60T 8/3615
251/129.02

(Continued)

OTHER PUBLICATIONS

Office Action for U.S. Appl. No. 14/849,541, dated Jun. 28, 2017, Beaver et al., "Evaluating Conversation Data based on Risk Factors", 18 pages.

(Continued)

*Primary Examiner* — Vu B Hang
(74) *Attorney, Agent, or Firm* — Meunier Carlin & Curfman

(57) ABSTRACT

This disclosure describes techniques and architectures for evaluating conversations. In some instances, conversations with users, virtual assistants, and others may be analyzed to identify potential risks within a language model that is employed by the virtual assistants and other entities. The potential risks may be evaluated by administrators, users, systems, and others to identify potential issues with the language model that need to be addressed. This may allow the language model to be improved and enhance user experience with the virtual assistants and others that employ the language model.

10 Claims, 11 Drawing Sheets

(51) Int. Cl.
*G10L 15/18* (2013.01)
*G10L 25/66* (2013.01)

(56) References Cited

U.S. PATENT DOCUMENTS

| | | |
|---|---|---|
| 8,677,377 B2 | 3/2014 | Cheyer et al. |
| 9,424,840 B1 | 8/2016 | Hart et al. |
| 2002/0008716 A1 | 1/2002 | Colburn et al. |
| 2008/0305815 A1* | 12/2008 | McDonough .......... H04L 51/38 455/466 |
| 2009/0235356 A1 | 9/2009 | Jensen et al. |
| 2009/0271205 A1 | 10/2009 | Finn et al. |
| 2011/0119196 A1 | 5/2011 | Ventura et al. |
| 2011/0288947 A1 | 11/2011 | Biran |
| 2013/0283168 A1 | 10/2013 | Brown et al. |
| 2014/0029734 A1 | 1/2014 | Kim et al. |
| 2014/0074454 A1 | 3/2014 | Brown et al. |
| 2014/0115456 A1 | 4/2014 | White et al. |
| 2014/0164476 A1 | 6/2014 | Thomson |
| 2014/0164508 A1* | 6/2014 | Lynch .............. H04L 29/08081 709/204 |
| 2016/0071517 A1 | 3/2016 | Beaver et al. |

OTHER PUBLICATIONS

Office action for U.S. Appl. No. 14/293,619, dated Sep. 8, 2014, Brown et al., "Virtual Assistant Acquisitions and Training", 15 pages.

Office action for U.S. Appl. No. 14/293,673, dated Sep. 8, 2014, Riegler et al., "Virtual Assistant Conversations", 22 pages.

\* cited by examiner

EVALUATING CONVERSATION DATA BASED ON RISK FACTORS

RELATED APPLICATIONS

This application is a continuation of and claims the benefit of U.S. patent application Ser. No. 14/849,541, filed Sep. 9, 2015, which claims the benefit of priority to U.S. Provisional Application No. 62/048,144, filed Sep. 9, 2014, and U.S. Provisional Application No. 62/049,982, filed Sep. 12, 2014, the contents of all are incorporated herein by reference.

BACKGROUND

A growing number of people are using smart devices, such as smart phones, tablet computers, laptop computers, and so on, to perform a variety of functionality. In many instances, the users interact with their devices through a virtual assistant. The virtual assistant may communicate with a user to perform a desired service or task, such as searching for content, checking-in to a flight, setting a calendar appointment, and so on. In order to enhance the user's experience with the virtual assistant, there is an increasing need to efficiently evaluate conversations had between users and the virtual assistant to fix potential problems with the virtual assistant.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
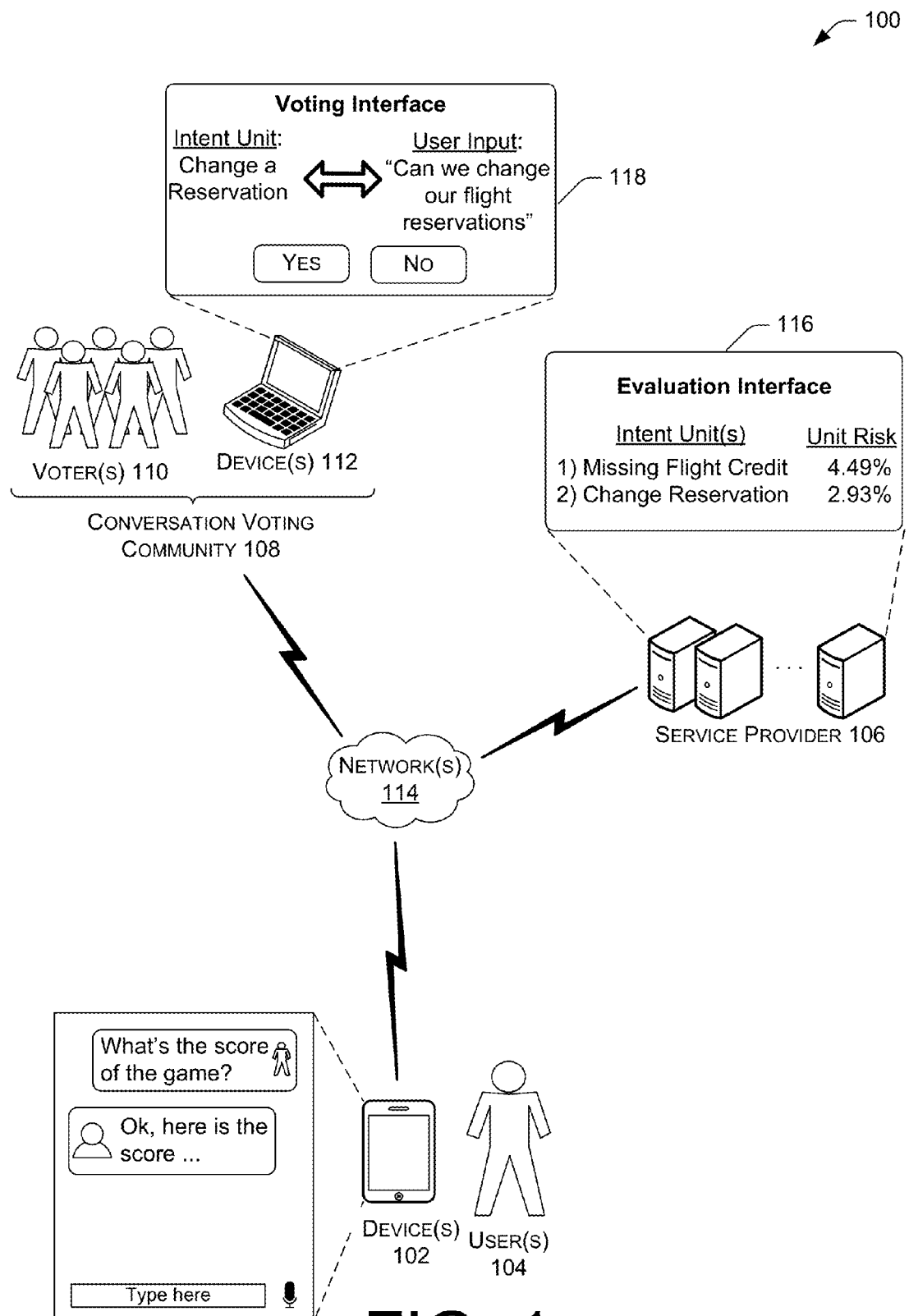
FIG. 1 illustrates an example architecture in which techniques described herein may be implemented.

This disclosure describes techniques and architectures for evaluating conversations. In some instances, conversations with users, virtual assistants, and others may be analyzed to identify potential risks within a language model that is employed by the virtual assistants and other entities. The potential risks may be evaluated by administrators, users, systems, and others to identify potential issues with the language model that need to be addressed. This may allow the language model to be improved and enhance user experience with the virtual assistants and others that employ the language model.

In some implementations, the techniques and architectures described herein may analyze conversation data for one or more conversations. The conversation data may generally include back-and-forth communications between a user and a virtual assistant or other system that employs Natural Language Processing (NLP) techniques, such as customer service agents. The NLP techniques may map user input to one or more intents (e.g., intent units) that are defined by a language model. Based on the mapping, a task may be performed, such as presenting a response (e.g., textual response, audio response, etc.), performing an action (e.g., booking a hotel room, scheduling an appointment, etc.), and so on. The conversation data may be analyzed to determine a confidence value for an identified intent. The confidence value may indicate a level of confidence, or measure of confidence, that the intent is accurately determined for the input (e.g., does the intent satisfy the input). To illustrate, if, during a conversation with a virtual assistant, a user asks "What is my flight status," the NLP techniques may map the user input to an intent unit that is associated with "flight status." Based on the identified intent unit of "flight status," a task to may be performed by the virtual assistant, such as providing a response of "Your flight is scheduled to leave on-time at 3:30." Here, the techniques and architectures may analyze the conversation to determine a level of confidence that the "flight status" intent unit is the correct intent unit that should have been identified.

A confidence value may be determined based on a variety of risk factors. The one or more risk factors may include various forms of information. For example, a risk factor may indicate whether or not an intent is identified for user input, whether or not user input proceeded a failure to identify an intent for other user input, whether or not user input is involved in a conversation that included a failure to identify an intent, whether or not a same intent is identified in a conversation, a tone of user's voice, a facial expression of a user, and so on. Other example risk factors are discussed in further detail herein. A "risk factor" may sometimes be referred to as a "risk indicator," while a confidence value may sometimes be referred to as a "risk score." In some instances, multiple risk factors may be used and weighted to generate a confidence value.

In some examples, a confidence value may be used to evaluate an intent unit. Here, the confidence value may be used to determine a health status (e.g., unit risk) that indicates a level of risk associated with the intent unit. To illustrate, in analyzing a variety of conversation data over time, multiple pieces of user input may be mapped to a same intent unit. If confidence values for the multiple pieces of user input indicate a relatively low confidence that the multiple pieces of user input should have hit the intent unit, then the health status of the intent unit may indicate that the intent unit is relatively risky. In other words, the health status may indicate that the intent unit needs to be updated. In some instances, the health status may be used to rank the intent unit relative to other intent units. The ranking and/or health status may be presented to an administrator of a language model or others, so that a language model may be evaluated. In some examples, the user may update the intent unit and/or other elements of the language model in order to address the risky intent unit. Alternatively, or additionally, the user may cause that the intent unit and/or corresponding user input be released to other users for further evaluation. To illustrate, the intent unit may be released to voters to obtain feedback (e.g., votes) from users regarding an accuracy of matching user input to the intent unit. The voters may view the intent unit and user input that hit the intent unit and provide an opinion as to whether or not they agree that the intent unit should have been identified for the user input. The results of the voting may be provided to the administrator so that further action may be taken (e.g., update the intent unit if the voters agree that the intent unit is risky).

Further, in some instances a confidence value may be used to determine whether or not a task should be performed during a conversation. For example, a confidence value may be generated as the conversation is occurring (e.g., in real-time). The confidence value may become a form of context to conversation that effects how the conversation proceeds. For example, if the confidence value is relatively high (e.g., more than a threshold), a task associated with the intent may be performed (e.g., in response to input of "How can I make one more reservation, then add it to the ticket," provide an answer "you need to login and click add flight to reservation" if the confidence value is relatively high). If the confidence value is relatively low (e.g., below a threshold), the user may be prompted for additional information (e.g., in response to input of "How can I make one more reservation, then add it to the ticket," provide a follow-up question of "what ticket are you referring to" if the confidence value is relatively low).

As this discussion highlights, the techniques and architectures described herein provide valuable resources to administrators and others. In some instances, a risky element of a language model may be identified. This may provide a relatively broad understanding of the language model and/or help prioritize what elements to update in the language model. Further, by improving the language model, this may ultimately enhance user interactions with virtual assistants and other entities that employ the language model. In some instances, the techniques may evaluate relatively large data sets that include thousands or hundreds-of-thousands of pieces of user input in an efficient and timely manner. Further, the techniques and architectures may evaluate a language model that may include thousands or hundreds-of-thousands of elements (e.g., intent units, etc.).

This brief introduction is provided for the reader's convenience and is not intended to limit the scope of the claims, nor the proceeding sections. Furthermore, the techniques described in detail herein may be implemented in a number of ways and in a number of contexts. Some example implementations and contexts are provided with reference to the following figures, as described below in more detail. It is to be appreciated, however, that the following implementations and contexts are but some of many.

Example Architecture

FIG. 1 illustrates an example architecture 100 in which the techniques described herein may be implemented. The architecture 100 includes one or more smart devices 102 (hereinafter "the smart device 102") to present a virtual assistant to one or more end-users 104 (hereinafter "the user 104") to perform tasks for the user 104. The virtual assistant may be implemented in cooperation with a service provider 106 that generally manages access to and/or functionality associated with the virtual assistant. In some instances, the service provider 106 operates in cooperation with a conversation voting community 108 to evaluate conversation data.

The conversation voting community 108 may include one or more voters 110 (hereinafter "the voter 110") to interact with one or more computing devices 112 (hereinafter "the computing devices 112") to provide feedback regarding conversations. The feedback may be provided to the service provider 106 for analysis. Although many processes are described as being performed by the service provider 106, in some instances any of the processes may be performed by the computing device 112 and/or the smart device 102. Further, while the service provider 106 is illustrated as a single service, the service provider 106 may be implemented as a variety of services that are implemented separately from each other (e.g., a virtual assistant service that is separate from a conversation analysis service). The smart device 102, the service provider 106, and/or the computing device 112 may communicate via one or more networks 114. The one or more networks 114 may include any one or combination of multiple different types of networks, such as cellular networks, wireless networks, Local Area Networks (LANs), Wide Area Networks (WANs), the Internet, and so on.

The service provider 106 may include one or more computing devices. The one or more computing devices may be implemented as one or more desktop computers, laptop computers, servers, and so on. The one or more computing devices may be configured in a cluster, data center, cloud computing environment, or a combination thereof. In one example, the service provider 106 provides cloud computing resources, including computational resources, storage resources, networking resources, and the like, that operate remotely to the smart device 102 and/or the computing device 112.

As noted above, the service provider 106 may perform a variety of operations. For example, the service provider 106 may analyze conversation data based on a variety of risk factors to generate confidence values for user input. A confidence value may then be associated with the corresponding user input and/or an intent unit that was hit for the user input. Additionally, or alternatively, the service provider 106 may determine a health status of an intent unit based on user input that is mapped to the intent unit. For example, the health status of an intent unit may indicate a number of user inputs (that have been mapped to the intent unit and) that have less than a threshold confidence value relative to a number of user inputs that have been mapped to the intent unit overall.

Further, the service provider 106 may provide a variety of user interfaces to assist in evaluating conversation data, such as any of the interfaces of FIGS. 4-8. As one example, the service provider 116 may provide an evaluation interface 116 to an administrator of the service provider 106. The administrator may view potentially risky intent units (e.g., in a ranking based on health status) and select an intent unit to release to voters. Then, the service provider 106 may provide a voting interface 118 via the computing device 112, so that the voter 110 may provide feedback regarding an accuracy of matching user input to an intent unit. As illustrated, the voter 110 may select "Yes" or "No" to indicate whether or not the voter agrees that the identified intent unit should map to the user input. The service provider 106 may collect feedback from a variety of voters over time. Although not illustrated in FIG. 1, the service provider 106 may be associated with an output device, such as a computer monitor, speaker, projector, computing device, and so on. The service provider 106 may provide user interfaces to, for example, an administrator via the output device.

The smart device 102, the computing device 112, and/or an output device associated with the service provider 106 may comprise any type of computing device that is configured to perform an operation. For example, the smart device 102 and/or the computing device 112 may be implemented as a laptop computer, a desktop computer, a server, a smart phone, an electronic reader device, a mobile handset, a personal digital assistant (PDA), a portable navigation device, a portable gaming device, a tablet computer, a wearable computer (e.g., a watch, optical head-mounted display (e.g., a pair of glass(es) with computing capabilities), etc.), a portable media player, a television, a set-top box, a computer system in a car, an appliance, a camera, a robot, a hologram system, a security system, a home-based computer system (e.g., intercom system, home media system, etc.), a projector, an automated teller machine (ATM), and so on. In some instances, a computing device is a mobile device, while in other instances the computing device is a stationary device.

The smart device 102 may output a virtual assistant to the user 104 via a conversation user interface. The virtual assistant may interact with the user 104 in a conversational manner to perform tasks. For example, in response to a query from the user 104 to "find the nearest restaurant," a virtual assistant may provide information through the conversation user interface that identifies the nearest restaurant. As such, the user 104 and/or the virtual assistant may communicate in a natural language format. A virtual assistant may be configured for multi-modal input/output (e.g., receive and/or respond in audio or speech, text, touch, gesture, etc.), multi-language communication (e.g., receive and/or respond according to any type of human language), multi-channel communication (e.g., carry out conversations through a variety of computing devices, such as continuing a conversation as a user transitions from using one computing device to another), and other types of input/output or communication.

In some implementations, a virtual assistant may comprise an intelligent personal assistant. A virtual assistant may generally perform tasks for users and act as an interface to information of a service provider, information of the smart device 102, information of the service provider 106, and/or any type of information. For example, in response to input from the user 104, a virtual assistant may access content items stored on a service provider and provide a content item to the user.

Further, in some implementations a virtual assistant may embody a human-like persona (e.g., human emulation) and/or artificial intelligence (AI). For example, a virtual assistant may be represented by an image or avatar that is displayed on the smart device 102. An avatar may comprise an animated character that may take on any number of shapes and appearances, and/or resemble a human talking to a user. In some instances, the avatar may be arranged as a representative of a service provider or the service provider 106, while in other instances the avatar may be a dedicated personal assistant to a user. Example virtual assistants are described in U.S. application Ser. No. 14/293,586, filed Jun. 2, 2014, which is incorporated herein by reference.

The smart device 102 may be equipped with one or more processors, memory, and/or one or more network interfaces. The smart device 102 may also include one or more cameras, one or more displays, one or more microphones, one or more speakers, and/or one or more sensors. These components may be communicatively coupled to the one or more processors. The one or more processors may include a central processing unit (CPU), a graphics processing unit (GPU), a microprocessor, a digital signal processor and so on. The one or more cameras may include a front facing camera and/or a rear facing camera. The one or more displays may include a touch screen, a Liquid-crystal Display (LCD), a Light-emitting Diode (LED) display, an organic LED display, a plasma display, an electronic paper display or any other type of technology. The one or more sensors may include an accelerometer, compass, gyroscope, magnetometer, Global Positioning System (GPS), olfactory sensor (e.g., for smell), heart rate sensor, light sensor, capacitive sensor, inductive sensor, eye tracking device, or other sensor.

Example Devices

Figure 2:
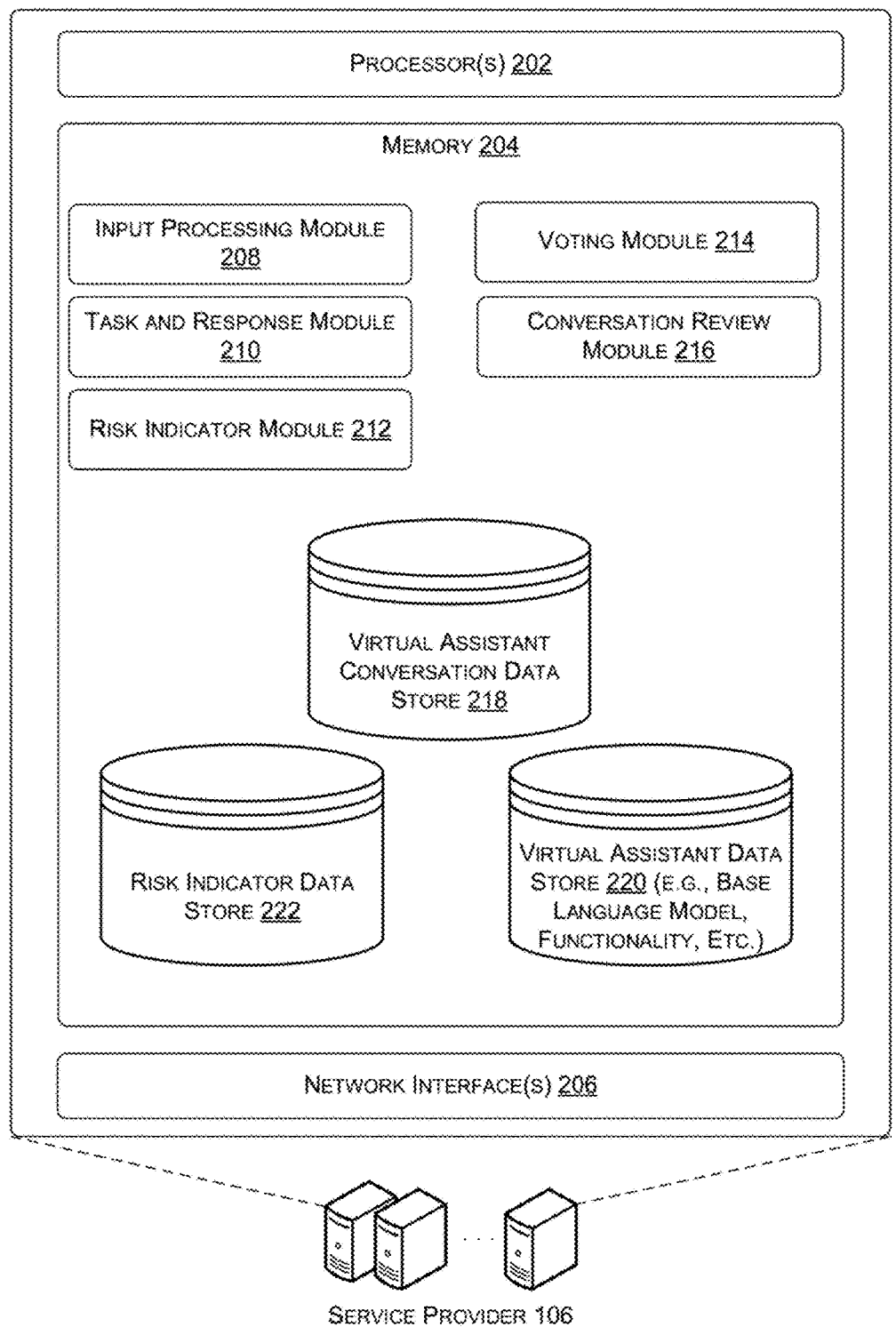
FIG. 2 illustrates example details of a virtual assistant service.

FIG. 2 illustrates details of the example the service provider 106 of FIG. 1. In some examples, the service provider 106 may be implemented as one or more computing devices. The one or more computing devices may include one or more processors 202, memory 204, and one or more network interfaces 206. The one or more processors 202 may include a central processing unit (CPU), a graphics processing unit (GPU), a microprocessor, a digital signal processor, and so on.

The memory 204 may include software functionality configured as one or more "modules." The term "module" is intended to represent example divisions of the software for purposes of discussion, and is not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.). Further, while certain functions are described herein as being implemented as software modules configured for execution by a processor, in other embodiments, any or all of the functions may be implemented (e.g., performed) in whole or in part by hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), etc.

The memory 204 (as well as all other memory described herein) may include one or a combination of computer-readable media (e.g., computer storage media). Computer-readable media includes volatile and non-volatile, removable and non-removable media implemented in any method or technology for storage of information, such as computer readable instructions, data structures, program modules, or other data. Computer-readable media includes, but is not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer-readable media does not include communication media, such as modulated data signals and carrier waves. As such, computer-readable media is non-transitory media.

As illustrated in FIG. 2, the memory 204 includes an input processing module 208, a task and response module 210, a risk indicator module 212, a voting module 214, and a conversation review module 216.

The input processing module 208 may be configured to perform various techniques to process input received from a user. For instance, input that is received from the user 104 during a conversation with a virtual assistant may be sent to the input processing module 208 for processing. If the input is speech input, the input processing module 208 may perform speech recognition techniques to convert the input into a format that is understandable by a computing device, such as text. Additionally, or alternatively, the input processing module 208 may utilize Natural Language Processing (NLP) to interpret or derive a meaning and/or concept of the input. The speech recognition and/or NLP techniques may include known or new techniques.

In many instances, the input processing module 208 may map user input to an intent unit based on a pattern of components for the user input. The pattern may include an order and/or proximity of the components to each other. Each term in the user input may be mapped to a component that represents a variation(s) of a term(s). The pattern of components of the user input may then be mapped to a pattern defined within an intent unit. The intent unit may be associated with a task (described below), which may be performed to satisfy the user input. The task may include providing a response to a user, performing an action (e.g., booking a flight), and so on. As an example, a component for the term "car" may include synonyms and/or spelling variations of the term, such as "automobile," "kar," etc. Example components include Vocab Terms (e.g., vocabulary synonyms and/or spelling variations), Helper Terms (e.g., words or phrases that are commonly used, but have only one meaning, such as "and," "or," "but," etc.), Wild Cards (e.g., placeholders for any random word or words), and so on. Example components are described in U.S. application Ser. No. 12/014,229, filed on Jan. 15, 2008, which is incorporated herein by reference.

The task and response module 210 may be configured to identify and/or perform tasks and/or formulate a response to input and based on an intent unit the input has been mapped to. In general, the triggering of an intent unit may cause a tasks and/or responses to be provided by the task and response module 210. As noted above, users may interact with virtual assistants to cause tasks to be performed by the virtual assistants. In some instances, a task may be performed in response to explicit user input, such as playing music in response to "please play music." In other instances, a task may be performed in response to inferred user input requesting that that the task be performed, such as providing weather information in response to "the weather looks nice today." In yet further instances, a task may be performed when an event has occurred (and possibly when no input has been received), such as providing flight information an hour before a flight, presenting flight information upon arrival of a user at an airport, and so on.

A task may include any type of operation that is performed at least in part by a computing device. For example, a task may include logging a user into a site, setting a calendar appointment, resetting a password for a user, purchasing an item, opening an application, sending an instruction to a device to perform an act, sending an email, navigating to a web site, upgrading a user's seat assignment, outputting content (e.g., outputting audio (an audible answer), video, an image, text, a hyperlink, etc.), and so on. Further, a task may include performing an operation according to one or more criteria (e.g., one or more default settings), such as sending an email through a particular email account, providing directions with a particular mobile application, searching for content through a particular search engine, and so on.

A task may include or be associated with a response to a user (e.g., "here is your requested information," outputting content, etc.). A response may be provided through a conversation user interface associated with a virtual assistant. In some instances, a response may be addressed to or otherwise tailored to a user (e.g., "Yes, John, as a Gold Customer you are entitled to a seat upgrade, and I have provided some links below that may be of interest to you . . . "). Input and/or output between users and virtual assistants (e.g., conversations) may be stored in a virtual assistant conversation data store 218.

The risk indicator module 212 may be configured to determine a measure of confidence (e.g., confidence value) that input received from the user 104 has been mapped to the correct intent unit of a language model (stored in a virtual assistant data store 220). The risk indicator module 212 may use one or more risk indicators, or risk factors, from a risk indicator data store 222 in order to identify the measure of confidence that the input was mapped to the correct intent unit. The one or more factors may include various forms of information. A factor may sometimes be referred to as a "risk indicator," while a confidence value may sometimes be referred to as a "risk score," "measure of confidence," or "degree of confidence." In some instances, multiple factors may be used and weighted to generate a confidence value. The weighted factors may be combined to form the confidence value. Example factors that may be used to evaluate conversation data include:

- user feedback from a user regarding an evaluation of at least a portion of a conversation (e.g., a rating provided by a user during the conversation or after of how well the user felt his questions were answered, information from a survey regarding a conversation, etc.)—the feedback may cover a single response for a single input or may cover multiple responses and/or inputs;
- user feedback from an administrator (e.g., a user associated with a virtual assistant service) regarding an evaluation of at least a portion of a conversation;
- a user feedback from a business entity (e.g., a business who uses the virtual assistant service for their business) regarding an evaluation of at least a portion of a conversation;
- a tone of a user's voice during a conversation (e.g., the user sounds upset or happy, the user uses a loud voice when communicating (above a threshold volume), etc.);
- a gesture of a user during a conversation (e.g., the user shakes his head when a response was provided, the user provides a thumbs-down, the user provides other body movement, etc.)—the gesture may be obtained from a camera or other sensor;
- a facial expression of a user during a conversation (e.g., the user raised an eye brow, frowned, etc.);
- a sensor signal obtained from monitoring user response (e.g., a hear rate of the user, eye movement, movement of device, placing a phone into a pocket (identified from light sensor), closing an application, ending a conversation, etc.)—a sensory may include a heart rate monitor, eye tracking device, and so on;
- a message from a user about a conversation (e.g., the user posts a comment on a blog or social media site about a bad experience with a virtual assistant, the user sends a text message about a conversation, etc.);

a confidence value determined by one or more Natural Language Processing (NLP) systems including, for example, a comparison of natural language understanding of user input (e.g., a confidence value from a probabilistic model or statistical model (sometimes referred to as a "classifier"))—an intent unit that is identified for an input may be analyzed by a model that generates its own confidence value of how accurately the intent unit satisfies the input;

whether or not a classifier, trained via machine learning using an independent dataset, maps the input to an intent unit different than that of an intent unit mapped to the input by the natural language processing system;

whether or not the input triggered a particular intent unit (e.g., insult or apology intent unit) indicating that a user is frustrated or upset;

whether or not the input is involved in a conversation that includes an escalation (e.g., a virtual assistant was unable to provide a response and the conversation transferred to a human assistant to continue the conversation);

whether or not the input preceded an escalation;

whether or not the input is mapped to an intent unit associated with answering threats, swearing, or cursing;

whether or not the input contained a word unknown to the natural language processing system;

whether or not the input is mapped to an intent unit (e.g., whether or not an intent unit is found) (a failure to identify an intent unit is referred to as an "I don't know" (IDK) response indicating that a response in a language model is not identified);

whether or not the user input directly preceded other user input for which a natural language processing system failed to identify an intent;

whether or not the user input is involved in a conversation in which the natural language processing system failed to identify an intent (e.g., whether or not the input is involved in a conversation that included a particular response indicating that a response in a language model is not identified for the input);

whether or not the user input is one of multiple user inputs for which the natural language processing system identifies a same intent two or more times overall and/or in a row (e.g., whether or not the input triggers a response that is involved in two or more sequential hits to a same intent unit);

whether or not the input is involved in a conversation in which a natural language processing system identifies a same intent two or more times overall and/or in a row;

whether or not the input is involved in a conversation in which two or more intent units are identified for the same input (e.g., a tie);

whether or not the input is mapped to an intent unit that is designated as being associated with personality (e.g., personality intent unit—an intent unit that is not directly related to the subject matter being discussed, such as an intent unit related to your favorite color when the subject matter is booking a flight);

whether or not a threshold number of personality intent units are hit (e.g., within a window of time, in a row, within a number of input interactions, etc.);

a combination of any of the above factors; or any other factor.

In some examples, a confidence value may be generated after a conversation has occurred. For example, a confidence value may be generated for an action that was performed for user input (e.g., evaluate previous conversations between users and virtual assistants). While in other instances, a confidence value may be generated in real-time as a conversation is taking place.

The confidence value may have various uses. For example, the confidence value may be used to determine whether or not an input received from a user corresponds to the intent unit that the input was mapped to. For instance, if the confidence value is below (or above) a predetermined threshold, it may be determined that there is a risk the input was incorrectly (or alternatively correctly) mapped to the corresponding intent unit. In another example, the confidence value may be used during a conversation. If, for example, the confidence value is less than a predetermined threshold, a predetermined response could be provided (e.g., Input: "How high is the Eiffel tower?" Answer: "I don't know a lot about world attractions, but I can do a Google® search for you") and/or a follow-up question may be provided to obtain further information (e.g., for input of "what's the status," a follow-up question of "are you referring to the status of a flight" may be presented). Alternatively, if the confidence value is greater than the predetermined threshold, a task associated with the intent unit may be automatically performed. As such, the confidence value may provide context to interpret input and/or formulate a response.

Additionally, the risk indicator module 212 may further allow a user of the service provider 106 to configure a weight associated with the individual risk indicators, or factors, stored in the risk indicator data store 222. For example, a risk indicator that an administrator determines to be more important, or determinative, in determining whether an input is mapped to the appropriate intent unit may be weighted more heavily than other risk indicators.

The techniques and architectures of the risk indicator module 212 may be utilized to evaluate conversation data in a variety of contexts. In one example, conversation data that is obtained from a conversation between a user and a virtual assistant may be analyzed. In another example, conversation data from a conversation between a user and another user may be analyzed. In yet a further example, a conversation between a chat bot and a user may be analyzed.

The voting module 214 may be configured to allow voters to vote on whether or not user input was correctly mapped to an intent unit. In some examples, the voters may answer "yes," "no," or "unsure" when asked whether the input was correctly mapped to the intent unit. In some examples, the voters may be selected from a pre-approved voter list. The voters may have been determined to have knowledge sufficient to vote on mappings between intent units and inputs. In some examples, a particular voter may only be approved for certain intent units. In some instances, a predetermined number of voters may vote on a same item (e.g., a same intent unit mapped to user input).

In some examples, two or more voters may be prompted for their feedback regarding mapping of user input to intent units. This may help eliminate bias between individual voters. Further details regarding interfaces of the voting module 214 are described in greater detail below with respect to FIG. 6. In some examples, the voting module 214 may access conversations that are stored in a virtual assistant conversation data store 218. In various examples, the virtual assistance conversation data store 218 may include conversations that have inputs mapped to a same intent unit.

The conversation review module 216 may allow a user, voter, or an administrator to review inputs and their respective intent units (e.g., tasks and responses), as well as votes received via the voting module 214 from voters. In some examples, the conversation review module 216 may allow a user (e.g., administrator) to review a conversation including an input and which intent unit the input was mapped to. Additional information may be provided to an administrator, such as a type of input (e.g., test question, current input, etc,). Further, the conversation review module 216 may present to an administrator the voting results collected from the voting module 214, and suggest an action to be taken based on the voting results. Various implementations of the conversation review module 216 are discussed further with respect to FIG. 8.

In various embodiments, the risk indicator module 212, the voting module 214, the conversation review module 216, or a combination thereof, may be employed to evaluate weights associated with the risk indicators. For example, based on votes cast by voters, and the risk indicators used, a determination can be made to weight a risk indicator move heavily, or less heavily. For example, after viewing one or more conversations, it may be determined that a particular risk indicator generally indicates that input is correctly mapped to the intent unit and determined that the voters also indicate that the input should be mapped to the intent unit. In cases such as this, the particular risk indicator may be identified as being an effective indicator of a measure of risk. Thus, the risk indicator may be relied on more heavily, or weighted more heavily, in determining risk in a language model.

Although the modules 208-216 are illustrated as being included in the service provider 106, in some instances one or more of these modules may be included in the computing device 112, the smart device 102, or elsewhere. As such, in some examples the service provider 106 may be eliminated entirely, such as in the case when all processing is performed locally. In addition, in some instances any of the data stores 218-222 may be included elsewhere.

Figure 3:
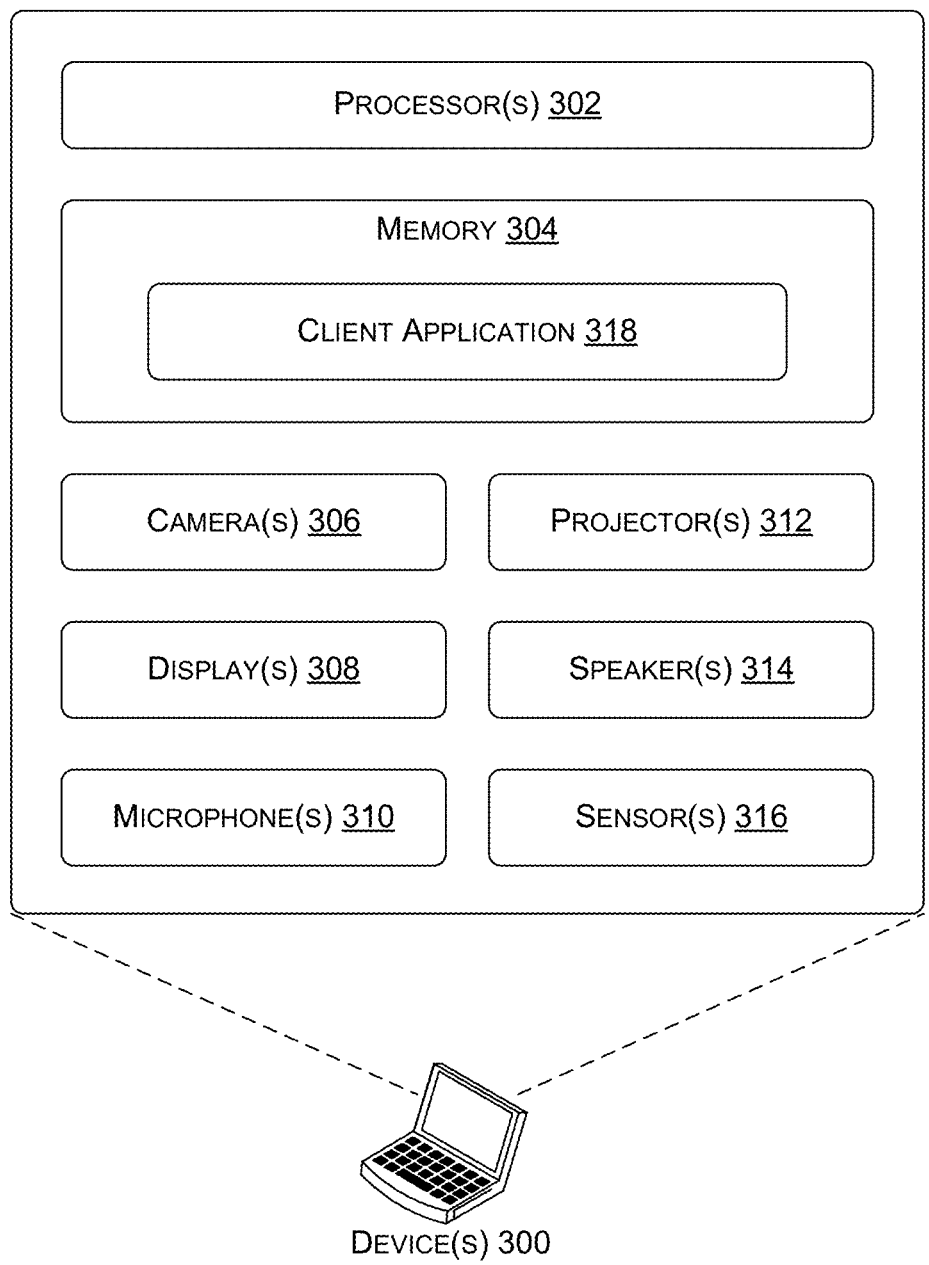
FIG. 3 illustrates example details of a smart device.

FIG. 3 illustrates example details of an example computing device 300, such as the computing device 110 and/or a computing device associated with the service provider 106 (e.g., an output device). The computing device 300 may be equipped with one or more processors 302, memory 304, one or more cameras 306, one or more displays 308, one or more microphones 310, one or more projectors 312, one or more speakers 314, and/or one or more sensors 316. The components 304-316 may be communicatively coupled to the one or more processors 302. The one or more processors 302 may include a central processing unit (CPU), a graphics processing unit (GPU), a microprocessor, a digital signal processor, and so on. The one or more cameras 306 may include a front facing camera and/or a rear facing camera. The one or more displays 308 may include a touch screen, a Liquid-crystal Display (LCD), a Light-emitting Diode (LED) display, an organic LED display, a plasma display, an electronic paper display, or any other type of technology. The one or more sensors 316 may include an accelerometer, compass, gyroscope, magnetometer, Global Positioning System (GPS), olfactory sensor (e.g., for smell), or other sensor. The components 306-316 may be configured to receive user input, such as gesture input (e.g., through the camera), touch input, audio or speech input, and so on, and/or may be configured to output content, such as audio, images, video, and so on. In some instances, the one or more displays 308, the one or more projectors 312, and/or the one or more speakers 314 may comprise a content output device configured to output content and/or a virtual assistant. Although not illustrated, the computing device 300 may also include one or more network interfaces.

The memory 304 may include a client application 318, such as a web browser or application (e.g., mobile application, desktop application, etc.). In instances where the computing device 300 is implemented as the computing device 112 of FIG. 1, the client application 318 may be configured to output a voting interface and enable voters to provide feedback. Alternatively, in instances where the computing device 300 is implemented as an output device for the service provider 106, the client application 318 may output an interface to evaluate risk associated with an intent input and/or votes. In some instances, the client application 318 may be configured to facilitate any of the interfaces described below with respect to FIGS. 4-8.

Example Interfaces

FIGS. 4-8 illustrate example interfaces that may be presented to users, voters, administrators, and others. The interfaces may be provided via a web browser, an application (e.g., mobile application, desktop application, etc.), and so on. Although many of the interfaces are described as being presented via particular devices of the architecture 100, the interfaces may be presented via any device in the architecture 100 or other devices.

Figure 4:
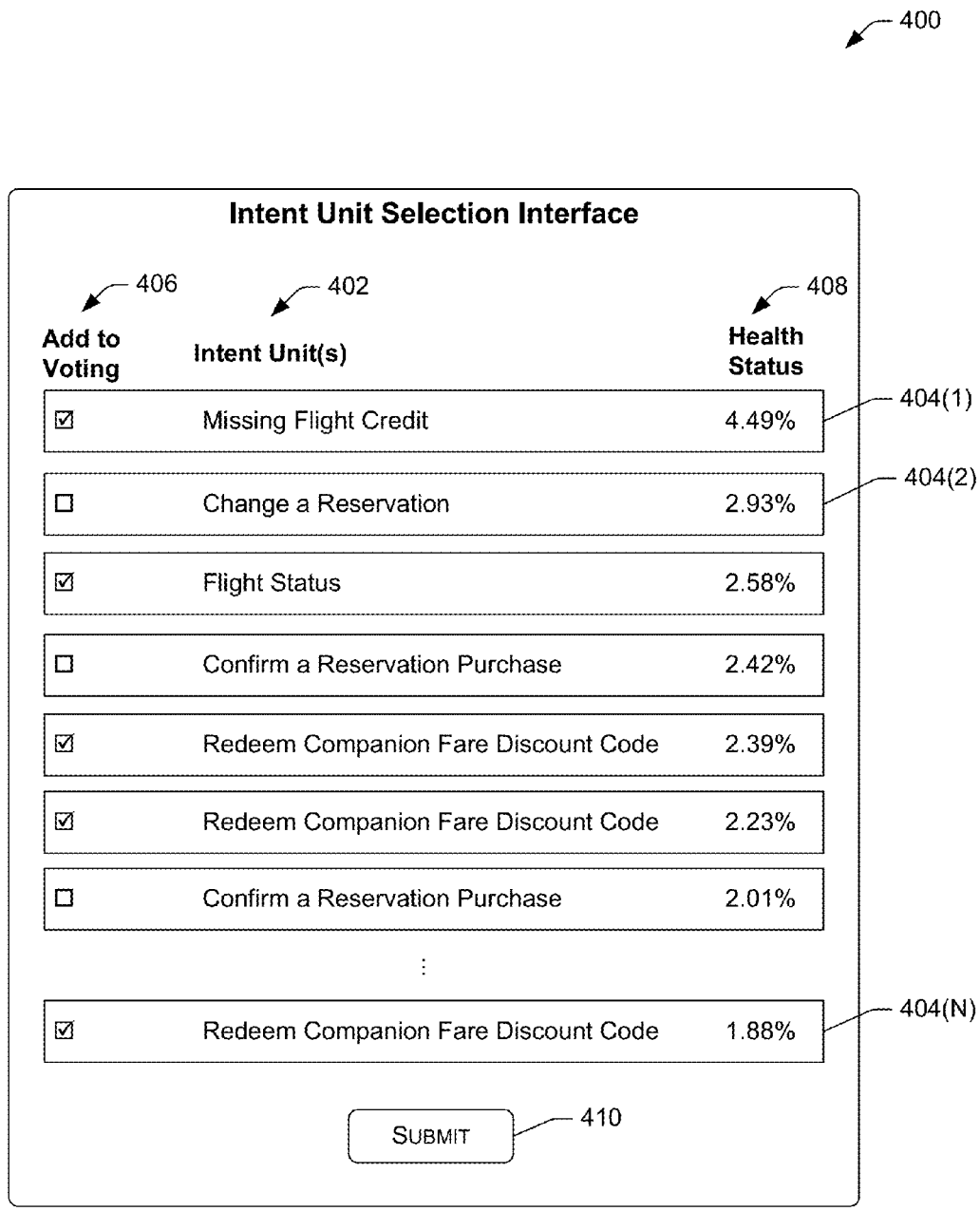
FIG. 4 illustrates an example intent unit selection interface that may be presented to facilitate selection of intent units to review for health status.

FIG. 4 illustrates an example intent unit selection interface 400 that may be presented to a user to select one of intent units 402 to evaluate, or to be output for evaluation. In some instances, the user may be an administrator of the service provider 106, while in other instances the user may be a voter or any other user. The intent units 402 may be included in a natural language model, and may comprise logic, rules, or algorithms used to map tasks, actions, or responses to input received during a conversation between a virtual agent and a user. Stated otherwise, the intent units 402 may comprise a class, or grouping, of responses that are used to respond to one or more user purposes or goals.

In some examples, the intent units 402 may be used to analyze a dataset of information, such as a chat/conversation history between a human and a virtual assistant. In some examples, a dataset may be created that is composed of conversations involving a virtual assistant where input received from a human is mapped to an intent unit to provide a response or action. As described above, various factors (e.g., risk indicators) may be used to determine a measure of confidence that the input was mapped to was the correct intent unit. By combining the measures of confidence for the conversations in a dataset, health statuses 404(1), 404(2) . . . 404(N) may be calculated for individual units. In some examples, the health statuses 404 may comprise a ratio of a number of user inputs that have a confidence value below a threshold relative to a total number of user inputs that have been mapped to the intent unit. As illustrated, the health status 404(1) for the intent unit "Missing flight credit" may have an overall health status of 4.49%. In some examples, each of the intent units 402 may be sorted (ranked) in a health status column 408 based on an associated health status 404 to identify which intent unit(s) are associated with the highest percentage of risk. Intent units that rank towards the top may have the highest need to be evaluated and/or modified. Thus, by ordering the intent units 402 based on health statuses 404, users may quickly identify which intent unit(s) to select for review and evaluation.

In some examples, the intent unit selection interface 408 may further have an "add to voting" option 408 for of the intent units 404. Thus, a user may check, or select, the intent units 402 that they would like to have analyzed further. Once the user has selected an intent unit for voting, the user may select a submit button 410 to output the selected intent unit for voting. In some examples, after selecting the submit button 410, the selected intent units may be output to a group of voters. In some examples, the voters may be selected from approved lists of voters. For examples, the voters may have already been determined to be competent or qualified to evaluate conversations specific to various intent units.

Figure 5:
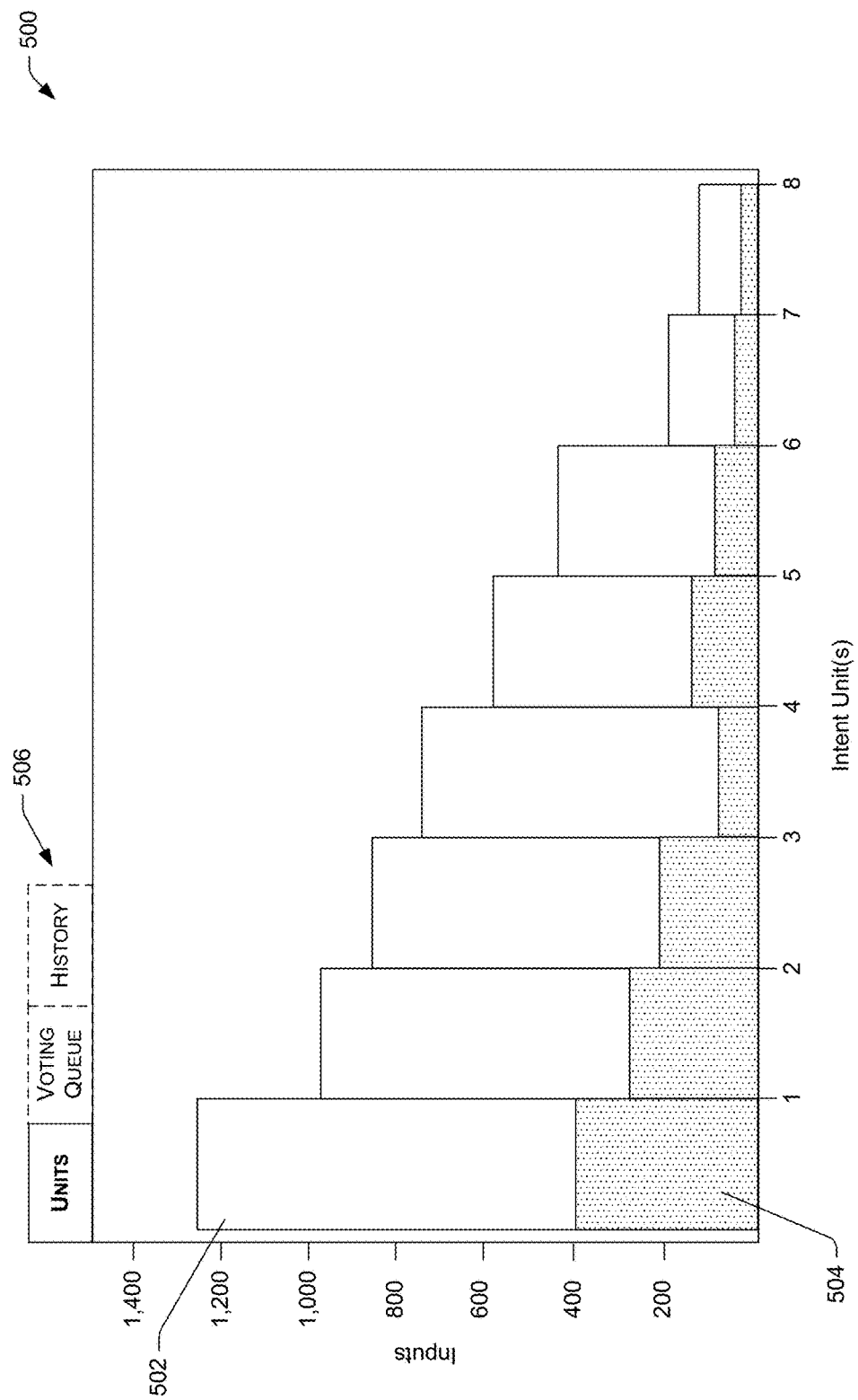
FIG. 5 illustrates an example chart for displaying health status associated with intent units.

FIG. 5 illustrates an example chart 500 for displaying health status associated with intent units. In the example shown, the chart 500 may comprise a bar graph. However, in other examples, other charts may be used such as a pie chart, line graph, or any other type of chart for displaying information.

In some examples, the chart 500 may plot information, such as intent unit(s), along an x-axis. In various examples, information such as inputs (e.g., number of user inputs) may be plotted on a y-axis of the chart 500. Thus, the chart 500 may display intent unit(s) versus inputs contained in a dataset of conversations mapped to intent unit(s). In some examples, intent unit(s) may each have a bar 502 indicates a total number of user inputs that have mapped to that intent unit and a bar 504 indicates a number of user inputs that have mapped to the intent unit and are associated with less than a threshold level of confidence (or higher than a threshold level of risk). As such, the bar 504 may indicate a percentage of the inputs that are risky. In this way, it may be determined visually which intent unit(s) are associated with the largest number of inputs, as well as the riskiest user inputs. In some examples, the chart 500 may further have one or more tabs 506 that, when selected, change the information, or a display of information, contained in the chart 500. For example, by selecting the tab "voting queue" of the one or more tabs 506, the chart 500 may switch to displaying information in another arrangement, such as the arrangement shown in the intent unit selection interface 400.

Figure 6:
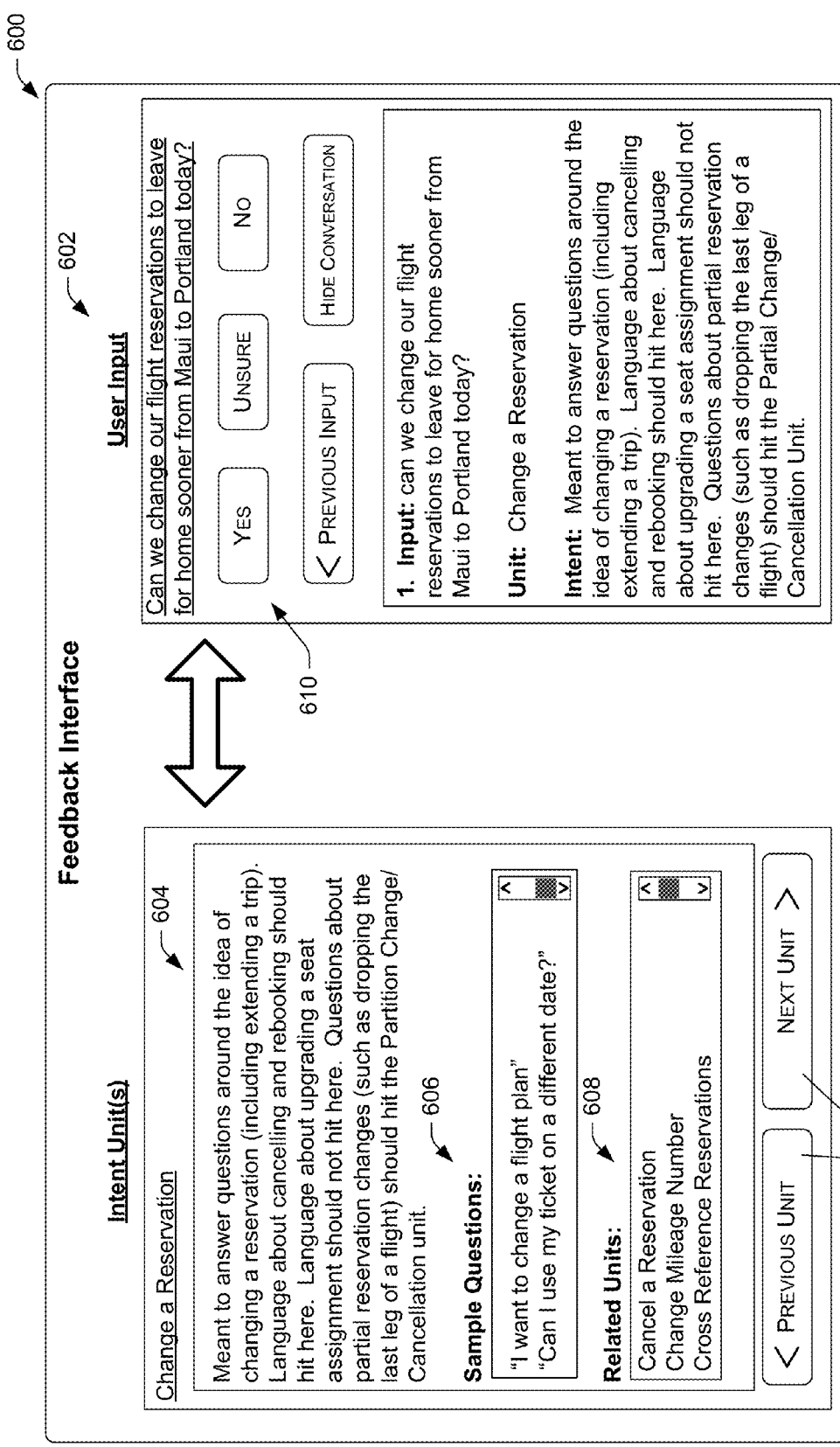
FIG. 6 illustrates an example feedback interface to allow a user to review and provide feedback on mapping of inputs to intent units.

FIG. 6 illustrates an example feedback interface 600 to allow a user to review and provide feedback on mapping of inputs to intent units. In some examples, the feedback interface 600 may allow a user to be prompted as to whether an intent unit is correctly mapped to user input 602. For example, a virtual agent may have determined that the user input 602 should be mapped to a response of intent unit. In the example shown, the intent unit corresponds to "change a reservation," and the user input 602 may be a question from a user, such as "can we change our flight reservations to leave for home sooner from Maui to Portland today?"

In some examples, additional information relating to the intent unit may be presented, such as the intent 604, sample questions 606, and related units 608. The intent 604 may comprise a summary of the intent deemed to be associated with the displayed intent unit. Using this displayed intent 604, a user may more easily be able to determine whether the user input 602 was correctly mapped to the intent unit. In some examples, the sample questions 606 may comprise inputs that represent the type of language that the intent unit is meant to answer. For instance, the intent unit in this example (e.g., "change a reservation") may be represented by inputs such as "I want to change a flight plan," or "can I use my ticket on a different date?" By presenting these the sample questions 606, a user, or voter may have additional context for determining whether the user input 602 is correctly mapped to the intent unit. The related units 608 may comprise other intent units which are similar to the one the user is viewing. In some examples, a user may select a related unit to view its associated intent. Thus, the intent 604, the sample questions 606, and the related units 608 may be displayed to help a user, or voter, make an informed decision about whether or not the input 602 is correctly mapped to the displayed intent unit.

In some examples, the user may determine, based on the intent 604, the sample questions 606, and/or the related units 608, whether or not the user input 602 was incorrectly mapped to intent unit. The user may select one or more vote buttons 610 to specify a "yes," "unsure," and "no" answer. Further, a user may use navigation buttons 612 to navigate to a next, or previous, unit. Thus, using the navigation buttons 612, a user may navigate to a next item to evaluate.

In some instances, the feedback interface 600 may be provided to any number of users so that a relatively large number of votes may be obtained. This may potentially avoid bias across users. Further, by providing an intent unit instead of a response that is provided by a virtual assistant, the users may better evaluate the interactions with the virtual assistant. This may also avoid potential user bias.

Figure 7:
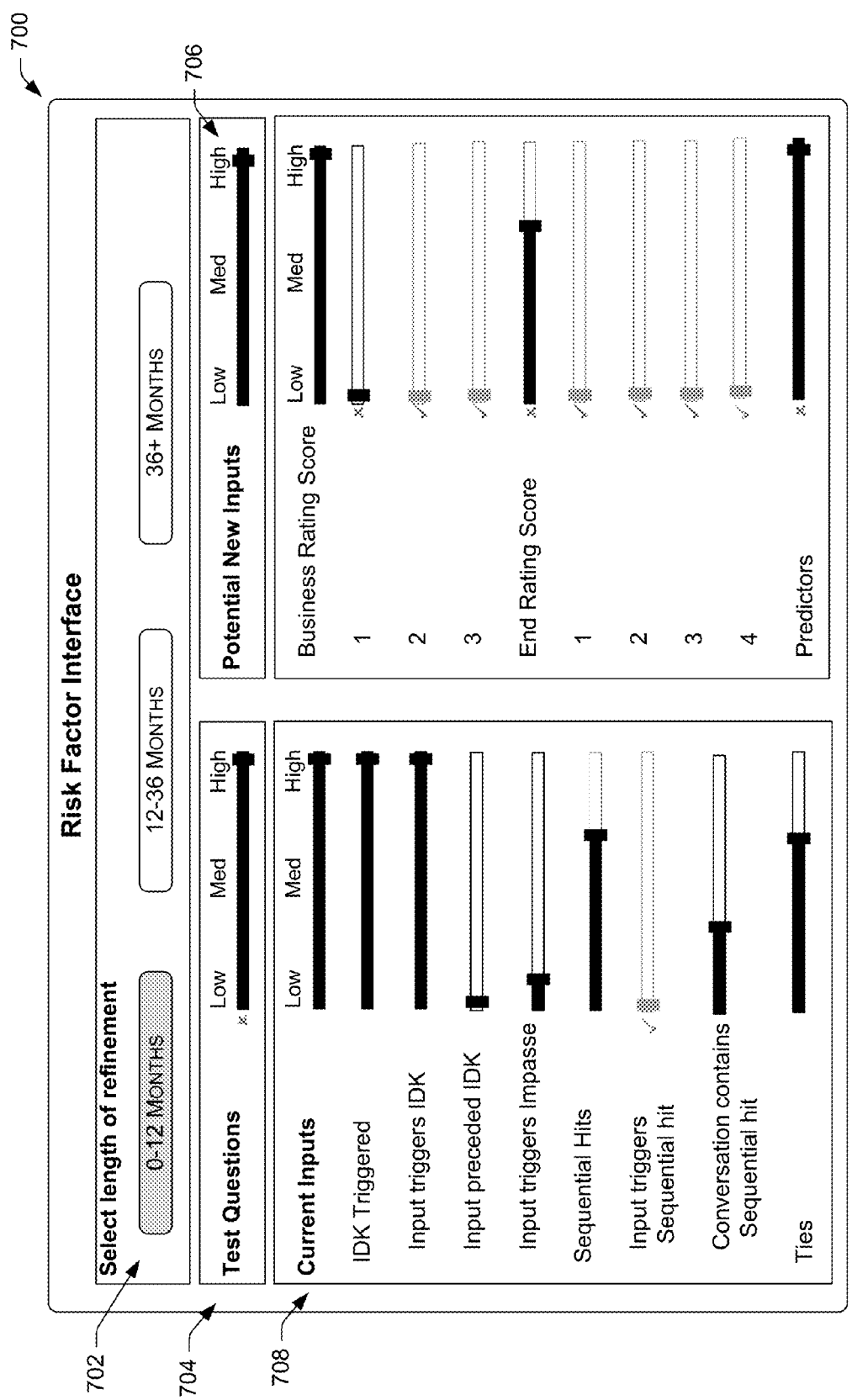
FIG. 7 illustrates an example risk factor interface to allow a user to configure factors for determining a risk that an input is incorrectly mapped to an intent unit.

FIG. 7 illustrates an example risk factor interface 700 to allow a user to configure risk factors. In some examples, the risk factor interface 700 may allow a user, such as an administrator of a language processing model, to weight risk factors. In some instances, the risk factors may be various characteristics associated with a conversation between a human and a virtual assistant that indicate a measure of confidence that an input was mapped to a correct intent unit.

In some examples, the risk factor interface 700 may allow a user to select various weights for factors that may be specific to certain datasets. For example, a dataset that contains a relatively small set of conversations, or that is "immature," may output more IDK responses as there is less training data available to aid in mapping of inputs to intent units. Thus, a user may want to weight IDK response with less importance for a particular dataset as it tends to occur often in an immature dataset that does not have a lot of training data (e.g., test questions).

In some examples, the risk factor interface 700 may be used to configure factors for a newly created dataset. In other examples, the risk factor interface 700 may be used to reconfigure factors for an existing dataset. In some examples, a user may select one of "length of refinement" buttons 702 to identify a range of time for conversations, test questions, or other stored items. For example, a user may select a "0-12 month" time period, which may indicate that only test questions and/or conversations that have been obtained in the previous 12 months may be considered.

In various examples, the test questions 704, the potential new inputs 706, and the current inputs 708 may have slider bars associated with one or more factors, or predictors, where the slider bars allow a user to configure an amount of importance (e.g., weight) they would like to assign to the factors or predictors. The amount of importance may be identified as "low," "medium," or "high." Alternatively, the amount of importance may be on any scale. In some examples, the predictors, or panel of predictors, may assign risk to an input based on the predictor's confidence that the intent unit the input was mapped to is correct, or appropriate.

As one example, a user may wish to add the test questions 704 to a dataset. In one example, the test questions 704 may have a single indication of risk when evaluating the measure of risk. For instance, the test questions 704 may assign risk to an input based on the predictor's measure of confidence that the intent unit to which an input is mapped. As shown, a slider bar may enable a user to select an amount of importance assigned to the test questions. In some examples, an icon (e.g., an "x" or a "✓") may be next to one or more slider bars to allow a user to turn on, or off, the evaluation of test questions, or other categories.

In some examples, the current inputs 708 may have a panel of to adjust weighting of risk indicators, such as "IDK triggered" and "sequential hits." For example, a slider bar associated with "IDK triggered" may configure a weighting applied to input that triggered an IDK response. Similarly, a slide bar for "sequential hits" may configure a weighting applied to input that is associated sequential hits, or sequential mappings, to an intent unit during the conversation. In another example, a slider bar for "ties" may be used to configure a weighting applied to ties of mapping an input in a conversation to intent units.

In various examples, advanced settings may be presented which allow a user to weight risk indicators in a more granular fashion. For example, "IDK triggered" may have weightings assigned to sub-items, such as "input triggers IDK" and "input preceded IDK." In this way, "IDK triggered" may be weighted more heavily when an input triggers the IDK, or when the input precedes the IDK.

Once the various risk factors, or predictors, have had weights assigned to them, the corresponding dataset may be updated based on the weighted factors. While the example illustrates manually assigning weights to factors using a scroll bar, or slider bar, it is understood that in other examples, the weighting may be configured automatically based on feedback received from human voters. For example, if human voters consistently determine that an input is correctly mapped to an intent unit, and that a particular risk factor has consistently determined that the input was mapped to that intent unit, the weight associated with that particular risk factor may be increased as it shows accuracy in determining risk.

Figure 8:
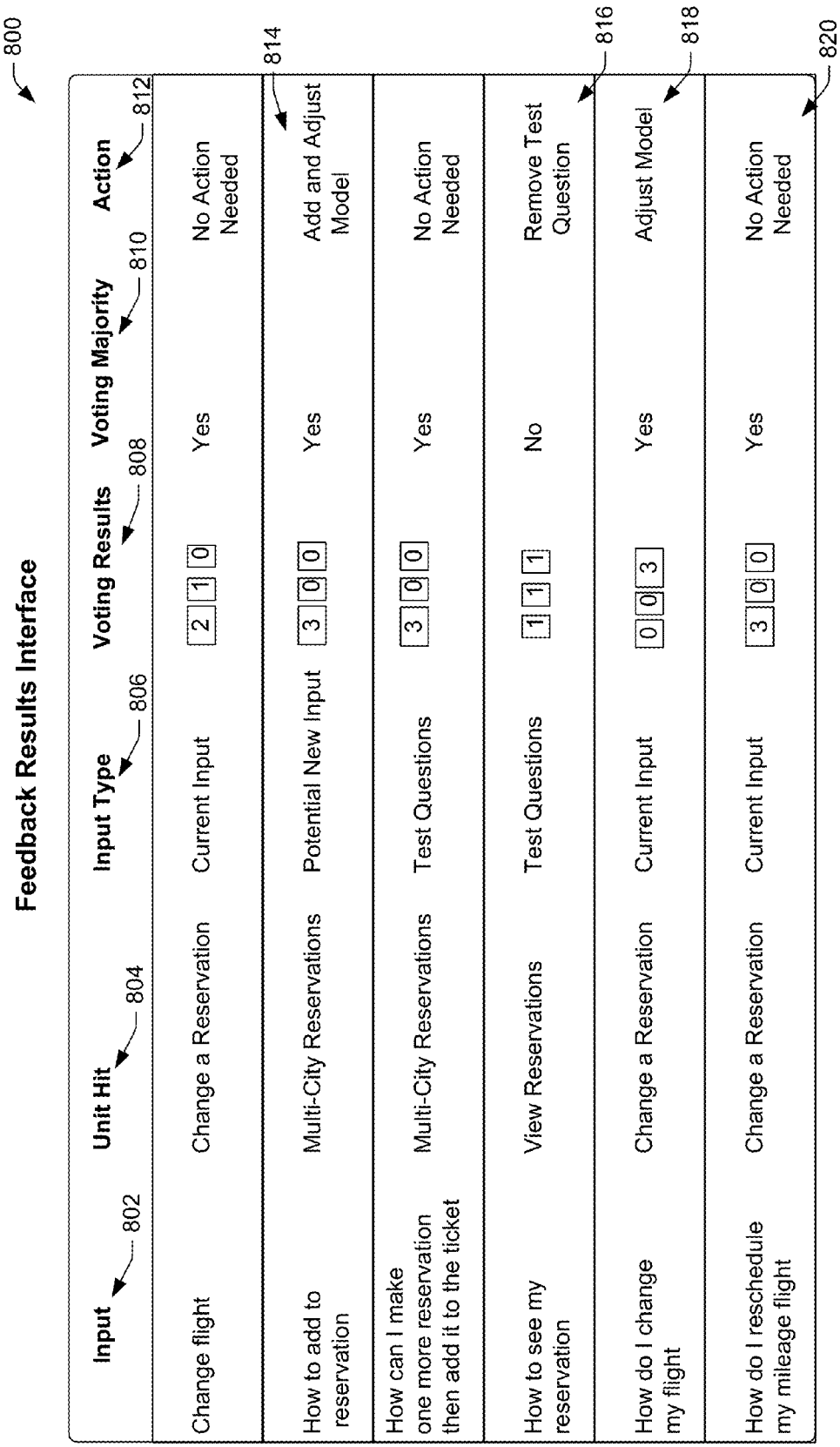
FIG. 8 illustrates an example feedback results interface for reviewing feedback on virtual assistant conversations.

FIG. 8 illustrates an example feedback results interface 800 for reviewing feedback received from voters regarding conversations. In some examples, the feedback results interface 800 may display voting results received from one or more voters. The feedback results interface 800 may be viewed by a user, such as an administrator, to allow the administrator to view results and take action on mappings between inputs and intent units.

In some examples, one or more columns of information may be displayed, such as an input column 802, a unit hit column 804 (e.g., for an intent unit), an input type column 806, a voting results column 808, a voting majority column 810, and an action column 812. However, in some examples, other columns may be added, and/or existing columns may be removed to display different information. In some examples, the input column 802 may identify the input text. The unit hit column 804 may identify the unit hit by (e.g., mapped to) the input. The input type column 806 may identify whether the input was a test question, current input, or potential new input. The voting results column 808 may show the outcome of votes for determining whether the input was correctly mapped to an intent unit. In some examples, the voting results may be indicated by three boxes indicating the amount of voters who said "yes," "no," or were "unsure" as to whether the input was correctly mapped to the intent unit. The voting majority column 810 may identify whether a majority had come to a decision regarding whether the input was correctly mapped to the intent unit. The action column 812 may provide a recommended action for the user, or administrator to take.

For example, as shown in row 814, the input type 806 has been identified as a "potential new input." Additionally, in the row 814, the voting results indicate that the voters, in this case three voters, all agreed that the potential new input was correctly mapped to the intent unit. While the boxes are illustrated as being ordered in the voting results column in order of "yes," "no," or "unsure" (from left to right), other variations may be presented. Additionally, the boxes may be color coordinated (e.g., "yes" box is green, "no" box is red, etc.) to visually illustrate how the voters cast their votes. In the row 814, because the voters all agreed that the potential new input was mapped to the correct intent unit, the action 812 suggested to the administrator is to add the new input and adjust the language model.

In another example, row 816, an input type 806 may be a test question, and the voting results 808 may indicate that the three voters could not come to a majority as to whether the test question had correctly mapped to an appropriate intent unit. In a case where no human voters can agree, an action 812 may be to remove the test question because it may not be an appropriate or helpful question to train a dataset.

In another example, row 818 may have an action such as "adjust model." This may occur in examples where the input type 806 is current input and the voting results 808 indicate that all three voters agree that the input was incorrectly mapped to the corresponding intent unit. In instances such as this, because the input type 806 is a current input, and/or the voters unanimously agree that the input was incorrectly mapped to an intent unit, the language model may require updates. In instances such as these, an administrator may need to perform further analysis of the language model to determine what errors caused the mistake in mapping.

In yet a further example, row 820 may have an action 812 such as "no action needed." This may occur in examples where the input type 806 is a current input, and the voting results indicate that all three voters agree that the input was correctly mapped to the corresponding intent unit. In instances such as this, because the input type 806 is a current input, and/or the voters unanimously agree that the input was correctly mapped to an intent unit, no action needs to be taken.

Example Processes

Figure 9:
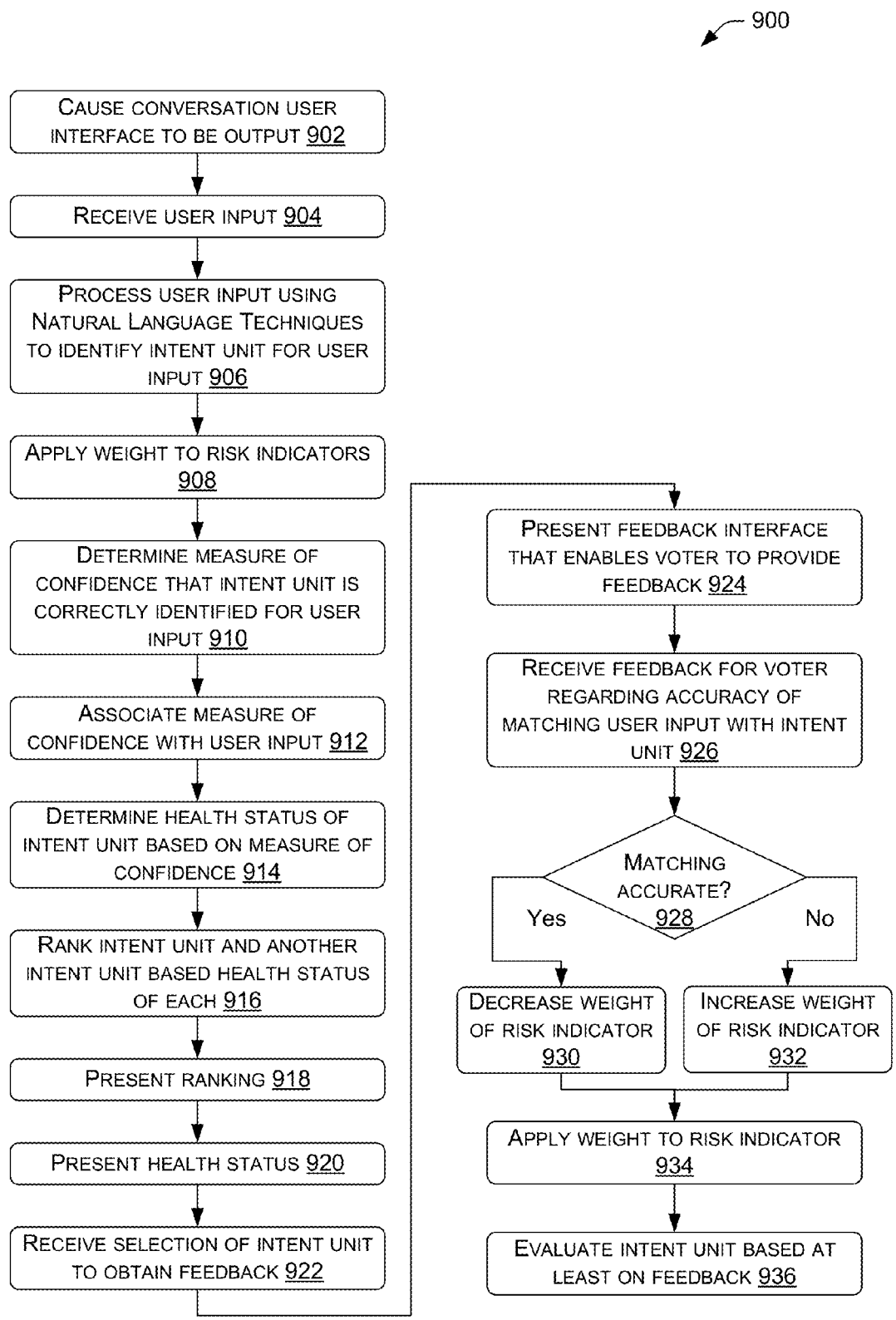
FIG. 9 illustrates an example process for determining a measure of confidence that input received from a conversation involving a virtual assistant is mapped to a correct intent unit, and receiving feedback from a voter regarding accuracy of the mapping.
Figure 10:
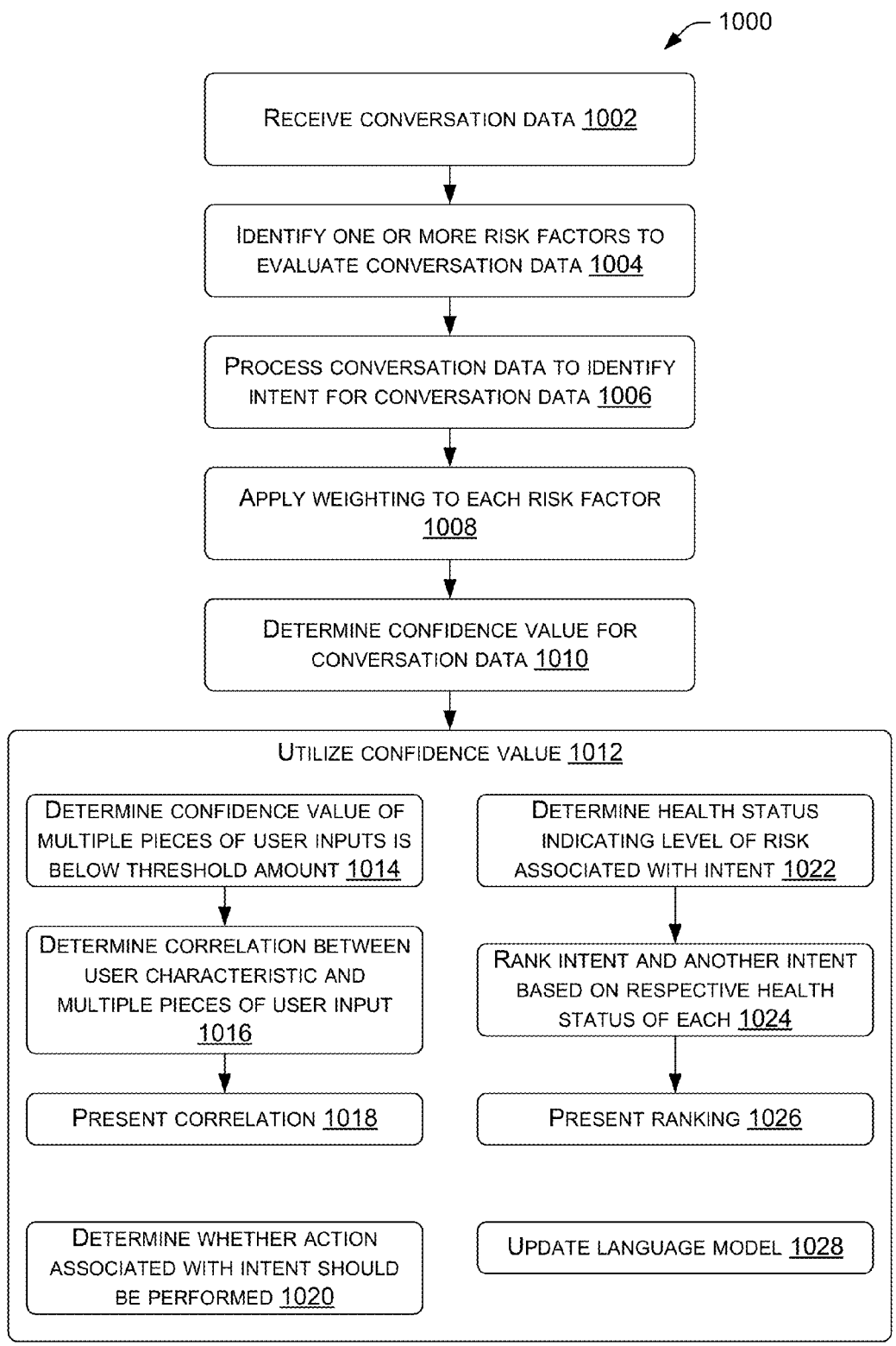
FIGS. 10 and 11 illustrate example processes for determining and utilizing confidence values of intents associated with user inputs.
Figure 11:
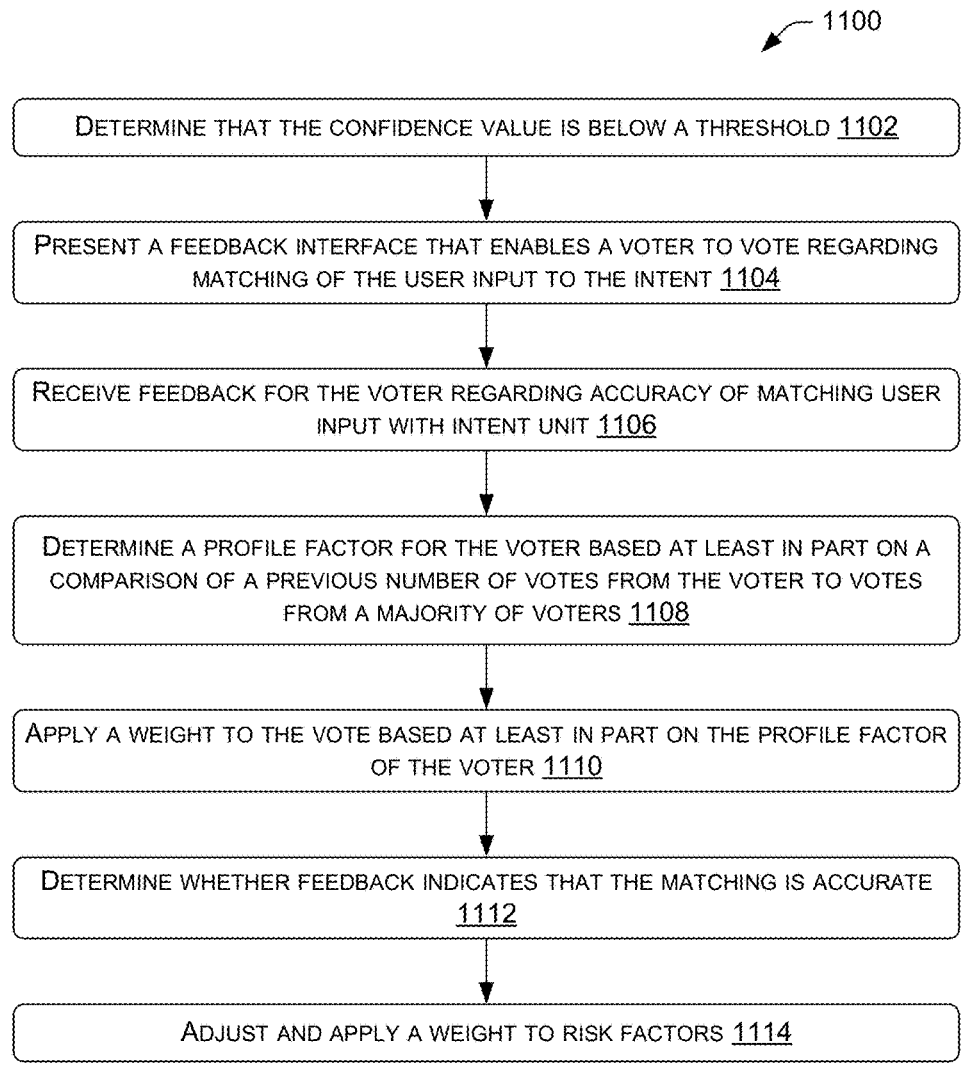

FIGS. 9-11 illustrate example processes 900, 1000, and 1100 for employing the techniques described herein. For ease of illustration the processes 900, 1000, and 1100 are described as being performed in the architecture 100 of FIG. 1. For example, one or more of the individual operations of the processes 900, 1000, and 1100 may be performed by the service provider 106, the computing device 112, and/or the smart device 102. However, the processes 900, 1000, and 1100 may be performed in other architectures. Moreover, the architecture 100 may be used to perform other processes.

The processes 900, 1000, and 1100 (as well as each process described herein) are illustrated as a logical flow graph, each operation of which represents a sequence of operations that can be implemented in hardware, software, or a combination thereof. In the context of software, the operations represent computer-readable instructions stored on one or more computer-readable storage media that, when executed by one or more processors, perform the recited operations. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Further, any number of the described operations may be modified or omitted.

FIG. 9 is a flowchart of an illustrative process 900 of for determining a measure of confidence that input received from a conversation involving a virtual assistant is mapped to a correct intent unit, and receiving feedback from a voter regarding accuracy of the mapping. For example, at 902, a conversation user interface may be output to a device to enable a conversation. For example, the user interface may be displayed on a display device. The conversation may take place between a user and a virtual assistant, two or more users, two or more virtual assistants, or combinations thereof.

At 904, user input may be received, for example, through the conversation user interface.

At 906, the user input may be processed to identify an intent of the user input. For example, an intent may be characterized as an intent unit. Additionally or alternatively, the processing may comprise processing the user input with one or more natural language processing techniques. Various embodiments contemplate that an intent unit may be associated with a language model for one or more of the natural language processing techniques. Additionally or alternatively, an intent unit may be associated with (i) an action to be performed at least partly by a virtual assistant, (ii) a pattern of components for triggering the intent unit, or (iii) combinations thereof.

At 908, a weighting may be applied to one or more risk factors. For example, a plurality of risk indicators may be identified and a weighting may be applied to each risk indicator generating a weighted risk indicators.

At 910, a measure of confidence that the intent unit is correctly identified for the user input may be determined. For example, the determining may be based at least in part on the presence of one or more risk indicators for the user input. Additionally or alternatively, the determining may be based at least in part on the weighted risk indicators.

At 912, a measure of confidence may be associated with the user input.

At 914, a health status of the intent unit may be determined where the health status may indicate a level of risk associated with the intent unit. For example, a health status of the intent unit may be determined based at least in part on one or more measures of confidence.

At 916, one or more intent units may be ranked with respect to each other. For example, an intent unit and another intent unit may be ranked based at least in part on the health status of the intent unit and a health status of the other intent unit. For example, a first intent unit may have a health status that indicates a relatively lower risk when compared to a second intent unit with a health status that indicates a relatively higher risk.

At 918, the health statuses may be presented. For example, the health statuses may be displayed to a user. One or more health statuses may be presented. All of the health statuses may be presented, for example, in ranked order. Various embodiments contemplate that only health statuses above or below a threshold will be presented. Various embodiments contemplate that only a set number of highest or lowest health statuses will be presented. Various embodiments contemplate that a user may use the rankings to select which health status and associated intent units and inputs to focus on. For example, a health status that indicates a relatively large number of hits and relatively large amount of risk may be selected to work on over a health status that indicates a lower number of hits and or a lower amount of risk.

At 920, the health status of the intent unit may be presented, for example, via an output device associated with an administrator.

At 922, a selection of the intent unit may be received to obtain feedback regarding the intent unit.

At 924, a feedback interface may be presented that enables a voter to provide feedback regarding matching of the user input to the intent unit.

At 926, feedback may be received for the voter regarding an accuracy of matching the user input to the intent unit. For example, the feedback may comprise a vote indicating whether or not the user input matches the intent unit.

At 928, the feedback may be evaluated to determine whether the feedback indicates that the matching of the user input to the intent unit is accurate. For example, if yes, at 930, a weight of a risk indicator may be reduced, for example, based at least in part on the determining that the feedback indicates that the matching of the user input to the intent unit is accurate. However, if no, then at 932, a weight of a risk indicator may be increased, for example, based at least in part on the determining that the feedback indicates that the matching of the user input to the intent unit is not accurate. However, various embodiments contemplate that based on how the implemented system is configured, at 930, the weight may be held steady or increased. Similarly, at 932, the weight may be held steady or decreased.

At 934, the weighting may be applied to the risk indicator.

At 936, the intent unit may be evaluated based at least in part on the feedback. For example, the evaluation my comprise presenting a feedback results interface that indicates at least one of a number of votes that are associated with an accurate matching of the user input to the intent unit or a number of votes that are associated with an inaccurate matching of the user input to the intent unit. Additionally or alternatively, a measure of confidence may be determined based at least in part on the presence and/or measure of the one or more weighted risk indicators.

FIG. 10 illustrates an example process 1000 for determining and utilizing confidence values of intents associated with user inputs. For example, at 1002, conversation data may be received. For example, the conversation data may be received as part of a conversation.

At 1004, one or more risk factors may be identified to evaluate conversation data associated with one or more users. Various embodiments contemplate that the conversation data may represent at least one conversation. Various embodiments contemplate that the conversation is between a user and a virtual assistant, one or more users and one or more virtual assistants, two or more users, two or more virtual assistants, or combinations thereof. Various embodiments contemplate that the risk factors may include any and all risk indicators including, but not limited to, the following: user feedback from a user regarding an evaluation of at least a portion of the least one conversation; user feedback from an administrator regarding an evaluation of at least a portion of the at least one conversation; a tone of a user's voice during the at least one conversation; a gesture of a user during the at least one conversation; a facial expression of a user during the at least one conversation; a sensor signal obtained from monitoring user response; a message from a user about the at least one conversation; a confidence value determined for the at least one conversation from at least one of a probabilistic model or statistical model, or combinations thereof. Additionally or alternatively, various embodiments contemplate that the risk factors may indicate, but is not limited to, any of the following: whether or not the processing identifies an intent for the user input; whether or not the user input directly preceded other user input for which the natural language processing system failed to identify an intent; whether or not the user input is involved in a conversation in which the natural language processing system failed to identify an intent; whether or not the user input is one of multiple user inputs for which the natural language processing system identifies a same intent two or more times in a row; whether or not the user input is involved in a conversation in which the natural language processing system identifies a same intent two or more times in a row; whether or not the user input is involved in a conversation in which the natural language processing system identifies a same intent two or more times, or combinations thereof.

At 1006, the conversation data may be processed with a natural language processing system to identify an intent for the conversation data.

At 1008, a weighting may be applied to each risk factor.

At 1010, a confidence value may be determined for the conversation data based at least in part on the one or more risk factors. Various embodiments contemplate that the confidence value indicates a level of confidence that the intent is accurately identified for the conversation data. Additionally or alternatively, determining the confidence value may be based at least in part on one or more of the plurality of weighted risk factors.

At 1012, the confidence value may be utilized. For example, at 1014, it may be determined that multiple pieces of user input are each associated with a confidence value that is below a threshold amount. Various embodiments contemplate that the conversation data includes the multiple pieces of user input. Various embodiments contemplate that user characteristic includes a demographic characteristic of a user. Various embodiments contemplate that a user characteristic includes context that is used to interpret user input of the conversation data. Various embodiments contemplate that context includes at least one of a type of device that is used by a user to provide the user input, purchase history, content that has been viewed by the user, or combinations thereof.

At 1016, a correlation between a user characteristic and the multiple pieces of user input may be determined.

At 1018, the correlation may be presented, for example, via an output device.

At 1020, the confidence value may be utilized to, for example, determine whether an action associated with the intent should be performed.

At 1022, the confidence value may be utilized to, for example, determine a health status that indicates a level of risk associated with the intent.

At 1024, the intent may be ranked with other intents. For example, the ranking may be based at least in part on a respective health status of each of the intents.

At 1026, the ranks may be presented.

At 1028, the confidence value may be utilized to update a language model associated with the natural language processing system.

FIG. 11 shows an illustrative process 1100 to utilize confidence values. For example, at 1102, a confidence value may be compared to a threshold value. If the confidence value is below the threshold, various actions may be taken.

At 1104, for example, a feedback interface may be presented. Various embodiments contemplate that that the feedback interface may enable a voter to vote regarding matching a user input, for example, from conversation data, to an intent.

At 1106, feedback from the voter may be received. For example, the feedback may comprise a vote regarding the accuracy of matching the user input with the intent unit.

At 1108, a profile factor may be determined for the voter. For example, the profile factor may be based at least in part on a comparison of a previous number of votes from the voter to votes from a majority of other voters. For example, a first voter may have a history of providing votes that are consistent with a majority of votes for each voting opportunity. Here, the voter profile factor may be relatively high (or increased to be higher than a threshold). Additionally, or alternatively, the first voter may have a history of providing votes that are consistent with a minority. Here, the voter profile factor may be relatively low (or decreased to be lower than a threshold). Additionally or alternatively, the first voter may have a relatively recent history of voting with the majority or minority. For example, a predetermined number of historical votes, a predetermined time period of historical votes, a recent streak of votes consistent with the majority or minority, or combinations thereof may be used in the comparison. Various embodiments contemplate that a majority of voter may comprise a predetermined number of voters.

At 1110, a weight may be applied to the vote of the voter. For example, the weight may be based at least in part on the profile factor of the voter. Various embodiments contemplate that the weight applied to the vote may create a weighted vote.

At 1112, whether the feedback indicates that the matching is accurate may be determined.

At 1114, a weight may be adjusted and/or applied to a risk factor. For example, the weight may be adjusted or modified based at least in part on the determining whether the feedback indicates that that matching of the user input to the intent is accurate. Additionally or alternatively, the weight may be adjusted based at least in part on one or more weighted votes. Additionally or alternatively, the weight may be adjusted or applied to the risk factors based at least in part on a maturity of intent units associated with the natural language processing system, or an amount of user inputs for the conversation data, or a combination thereof. Additionally or alternatively, the weight may be adjusted or applied based at least in part on recent changes to the language model, underlying knowledge base, services of the system, among others, or combinations thereof. For example, a relatively mature intent unit may act relatively immature if the application of the language model or knowledge base (among others) changes.

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. One or more non-transitory computer-readable media storing computer-readable instructions that, when executed, instruct one or more processors to perform acts comprising:
    causing a conversation user interface to be displayed on a display device to enable a conversation between a user and a virtual assistant;
    receiving, via the conversation user interface, user input;
    processing the user input with one or more natural language processing techniques to identify an intent unit for the user input, the intent unit being associated with a language model for the natural language processing techniques;
    determining, based at least in part on a presence of one or more risk indicators for the user input, a measure of confidence that the intent unit is correctly identified for the user input;
    associating the measure of confidence with the user input;
    determining a health status of the intent unit based at least in part on the measure of confidence, the health status indicating a level of risk associated with the intent unit;

presenting the health status of the intent unit via an output device associated with an administrator;
receiving a selection of the intent unit to obtain feedback regarding the intent unit;
presenting a feedback interface that enables a voter to provide feedback regarding matching of the user input to the intent unit;
receiving feedback for the voter regarding an accuracy of matching the user input to the intent unit; and
evaluating the intent unit based at least in part on the feedback, wherein the evaluating includes presenting a feedback results interface that indicates at least one of a number of votes that are associated with an accurate matching of the user input to the intent unit or a number of votes that are associated with an inaccurate matching of the user input to the intent unit.

2. The one or more non-transitory computer-readable media of claim 1, wherein the intent unit is associated with (i) an action to be performed at least partly by the virtual assistant and (ii) a pattern of components for triggering the intent unit.

3. The one or more non-transitory computer-readable media of claim 1, wherein the acts further comprise:
ranking the intent unit and another intent unit based at least in part on the health status of the intent unit and a health status of the other intent unit; and
presenting the ranking via the output device.

4. The one or more non-transitory computer-readable media of claim 1, wherein the one or more risk indicators include a plurality of risk indicators; and the acts further comprise:
applying a weighting to each of the plurality of risk indicators to generate weighted risk indicators;
wherein the determining the measure of confidence includes determining the measure of confidence based at least in part on the weighted risk indicators.

5. The one or more non-transitory computer-readable media of claim 1, wherein the acts further comprise:
determining that the feedback indicates that the matching of the user input to the intent unit is accurate;
decreasing a weighting to be applied to the one or more risk indicators based at least in part the on determining that the feedback indicates that the matching of the user input to the intent unit is accurate; and
applying the weighting to the one or more risk indicators;
wherein the determining the measure of confidence includes determining the measure of confidence based at least in part on the presence of the one or more weighted risk indicators.

6. The one or more non-transitory computer-readable media of claim 1, wherein the acts further comprises:
determining that the feedback indicates that the matching of the user input to the intent unit is not accurate;
increasing a weighting to be applied to the one or more risk indicators based at least in part on the determining that the feedback indicates that the matching of the user input to the intent unit is not accurate; and
applying the weighting to the one or more risk indicators;
wherein the determining the measure of confidence includes determining the measure of confidence based at least in part on the presence of the one or more weighted risk indicators.

7. The one or more computer-readable media of claim 1, wherein the feedback includes a vote indicating whether or not the user input matches the intent unit.

8. A system comprising:
one or more computing devices used by voters;
one or more servers of a service provider that are in communication with the one or more computing devices and one or more smart devices of one or more users, wherein the servers comprise:
one or more processors;
a database storing (i) conversation data representing at least one conversation between the one or more users and virtual assistants running on the one or more smart devices and (ii) one or more risk factors;
memory communicatively coupled to the one or more processors and storing executable instructions that, when executed by the one or more processors, cause the one or more processors to perform acts comprising:
processing the conversation data with a natural language processing system to identify an intent for the conversation data;
determining a confidence value for the conversation data based at least in part on the one or more risk factors, the confidence value indicating a level of confidence that the intent is accurately identified for the conversation data; and
utilizing the confidence value, wherein the utilizing includes:
determining that the confidence value is below a threshold;
presenting a feedback interface at the one or more computing devices that enables each voter to provide feedback regarding matching of user input of the conversation data to the intent;
receiving feedback for the voter regarding an accuracy of matching the user input to the intent;
determining whether or not the feedback indicates that the matching of the user input to the intent is accurate; and
adjusting a weighting applied to the one or more risk factors based at least in part on determining whether or not the feedback indicates that the matching of the user input to the intent is accurate.

9. The system of claim 8, wherein the presenting a feedback interface at the one or more computing devices that enables each voter to provide feedback regarding matching of user input of the conversation data to the intent comprises:
presenting a feedback interface at the one or more computing devices that enables a voter to vote regarding matching of the user input to the intent;
determining a profile factor for the voter based at least in part on a comparison of a previous number of votes from the voter to votes from a majority of voters, the majority of voters including more than a predetermined number of voters; and
applying a weighting to the vote based at least in part on the profile factor of the voter.

10. The system of claim 8, wherein the acts further comprise:
applying a weighting to at least one of the one or more risk factors based at least in part on a maturity of intent units associated with the natural language processing system, or an amount of user inputs for the conversation data, or a combination thereof.

* * * * *